United States Patent [19]
Okada et al.

[11] Patent Number: 5,895,900
[45] Date of Patent: Apr. 20, 1999

[54] PRESSURE SENSITIVE SEAT SWITCH WITH AIR VENT PASSAGES

[75] Inventors: Shoji Okada; Toshimitsu Oka; Naofumi Fujie; Kazuya Tanaka; Hitoshi Takayanagi, all of Aichi-pref, Japan

[73] Assignee: Aisin Seiki Kabushiki Kaisha, Kariya, Japan

[21] Appl. No.: 08/996,039

[22] Filed: Dec. 22, 1997

[30] Foreign Application Priority Data

Dec. 20, 1996 [JP] Japan ................... 8-341142

[51] Int. Cl.⁶ ........................... H01H 3/02; H01H 9/02
[52] U.S. Cl. ........................... 200/85; 200/86; 200/306
[58] Field of Search ..................... 200/5 A, 85 R, 200/85 A, 86 R, 512–517, 306

[56] References Cited

U.S. PATENT DOCUMENTS

| | | | |
|---|---|---|---|
| 3,704,352 | 11/1972 | Fontaine | 200/86 R X |
| 3,898,421 | 8/1975 | Suzumura | 200/241 X |
| 4,046,975 | 9/1977 | Seeger, Jr. | 200/306 X |
| 4,066,851 | 1/1978 | White et al. | 200/5 A |
| 4,066,855 | 1/1978 | Zenk | 200/5 A |
| 4,200,777 | 4/1980 | Miller | 200/85 A |
| 4,249,044 | 2/1981 | Larson | 200/306 X |
| 4,400,595 | 8/1983 | Ahumada | 200/306 X |
| 4,524,254 | 6/1985 | Yoshida et al. | 200/306 X |

FOREIGN PATENT DOCUMENTS

| | | |
|---|---|---|
| 249029 | 10/1990 | Japan |
| 2535120 | 6/1996 | Japan |

*Primary Examiner*—J. R. Scott
*Attorney, Agent, or Firm*—Sughrue, Mion, Zinn, Macpeak & Seas, PLLC

[57] ABSTRACT

A pressure sensitive switch includes a first insulating film provided on one surface thereof with an electrode sheet and an insulating spacer having one surface connected to one surface of the first insulating film and a thickness. The insulating spacer is formed with a plurality of holes, each having a diameter larger than the thickness and a plurality of air-vents, each having a width which is narrower than the diameter of the holes in such a manner that the holes and the air-vents are in mutual air communication and extend through the insulating spacer along its thickness direction. A second insulating film is provided on one surface thereof with another electrode sheet and one surface of the second insulating film is connected to the other surface of the insulating spacer. A cord has a first wire and a second wire connected to the electrode sheet of the first insulating film and the electrode sheet of the second insulating film, respectively. A plurality of air passages extend through the first insulating film along its thickness direction and are in air communication with the air-vents and exposed to an exterior atmosphere.

4 Claims, 3 Drawing Sheets

1

PRESSURE SENSITIVE SEAT SWITCH WITH AIR VENT PASSAGES

BACKGROUND OF THE INVENTION

The present invention relates to a mechanically operated pressure sensitive switch which is constructed in such a manner that an electric contact and an electric isolation between two opposed electrodes are established when a force is applied to one of the electrodes and when the force is released from the same, respectively. In particular, the present invention is directed, for example, to a flat or sheet shaped switch adapted to be provided in a seat cushion for indicating whether an occupant is on the seat cushion or not by an on/off binary code.

A conventional pressure sensitive sensor for detecting an occupant on a seat includes a magnet generator provided in a seat cushion and a magnet detector which is set to detect the intensity of a magnetic field generated by the magnet generator. When the occupant sits on the seat cushion, the resulting deformation or downward movement of the seat cushion changes the intensity of the magnetic field. As soon as such a change is detected by the magnet receiver, a controller to which the magnet receiver is connected stores this fact for further use.

Another similar conventional pressure sensitive sensor is disclosed in Japanese Patent No. 2535120. This sensor is in the form of a piezoelectric film sheet which is adapted to be provided in a seat cushion. Whenever an occupant sits on and moves away from the seat cushion, a change in force applied thereto varies and such a change is detected as a resistance value change in this sensor.

In addition, Japanese Patent Publication No. Hei2-49029 discloses a pressure sensitive switch. Unlike the foregoing pressure sensitive switches, this pressure sensitive switch is in association with a key board of an electric musical instrument which has a plurality of keys in a row and has a pair of opposed conductive plates between which a semiconductor is interposed. When a force is applied to each key, a resistance value between the conductive plates varies and on the basis of the resulting variation, an application of the force is detected. However, in the first mentioned conventional pressure sensitive switch, the sitting of the occupant on the seat is detected by the lowering movement of the seat per se. For assuring precise detection of such sitting movement by the occupant, a reliable downward movement of the seat has to be established which requires a device which is complex in construction and expensive to manufacture.

As for the second mentioned conventional pressure sensitive switch, the piezoelectric film is an essential component which is very expensive and requires a complex feedback loop electric circuit for oscillating the piezoelectric element continually and a filter for detecting such an oscillation. As a result, the device per se becomes complex in construction which results in a high cost to manufacture.

With respect to the last mentioned conventional pressure sensitive switch, this device is established on the assumption that the force is applied from the finger of a musician to each key. This means that each key is not expected to receive a large force equivalent to the occupant's weight and thus it is very difficult to use the switch for detecting the sitting of the occupant on the seat from the view points of durability, shock-proof, reliability with time and so on. In addition, if copper or silver is employed as the raw material of the conductive plate, the cost of the switch per se becomes very expensive. In brief, the conventional pressure sensitive sensors are not simple in construction, reliable or of low manufacturing cost.

SUMMARY OF THE INVENTION

A principal object of the present invention is to provide a pressure sensitive switch without the aforementioned drawbacks.

Another object of the present invention is to provide a pressure sensitive switch which is simple in construction, which remains reliable under severe conditions such as on-vehicle conditions and which can be manufactured at a low cost.

In order to attain the foregoing object, a pressure sensitive switch includes a first insulating film provided on one surface thereof with an electrode sheet; an insulating spacer having one surface connected to one surface of the first insulating film and a predetermined thickness, the insulating spacer being formed with a hole and an air-vent in such a manner that the hole and the air-vent are in mutual air communication and extend through the insulating spacer; a second insulating film provided on one surface thereof with another electrode sheet, said one surface of the second insulating film being connected to the other surface of the insulating spacer; a cord having a first wire and a second wire connected to the electrode sheet of the first insulating film and the electrode sheet of the second insulating film, respectively; and an air-passage passing through one of the first insulating film and the second insulating film and being in air communication with the air-vent and exposed to the exterior.

BRIEF DESCRIPTION OF THE DRAWINGS

The above and other objects, features and advantages of the present invention will be more apparent and more readily appreciated from the following detailed description of preferred exemplary embodiments of the present invention, taken in connection with the accompanying drawings, in which.

DETAILED DESCRIPTION OF THE INVENTION

Preferred embodiments of the present invention will be described hereinafter in detail with reference to the accompanying drawings.

Figure 1:
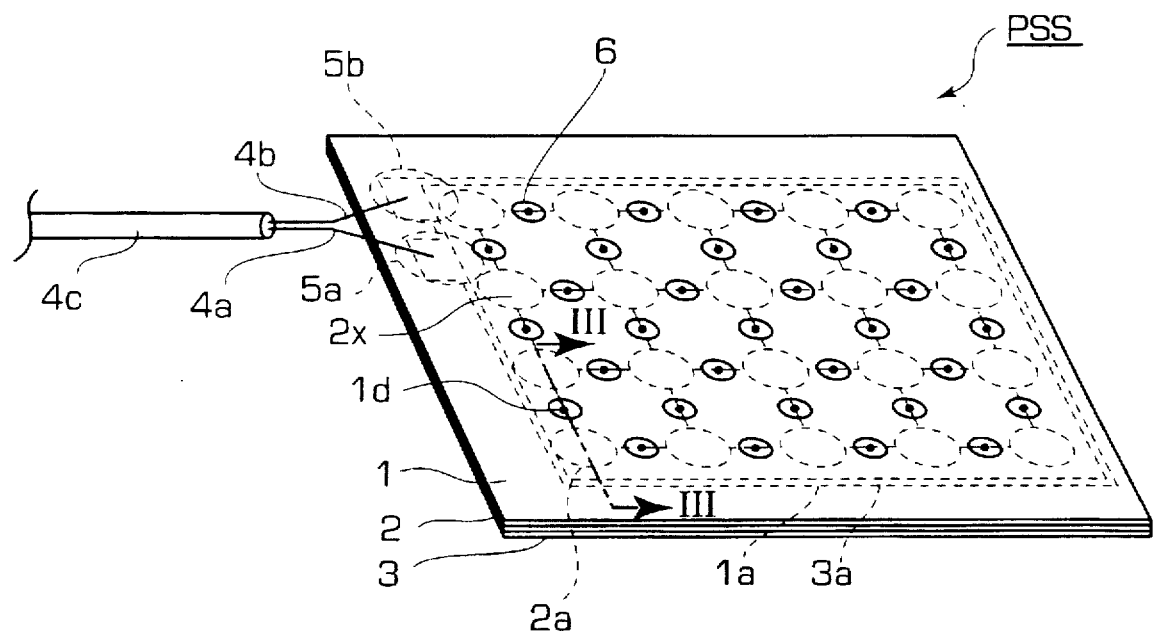
FIG. 1 is a perspective view of a pressure sensitive switch according to a first embodiment of the present invention.
Figure 2:
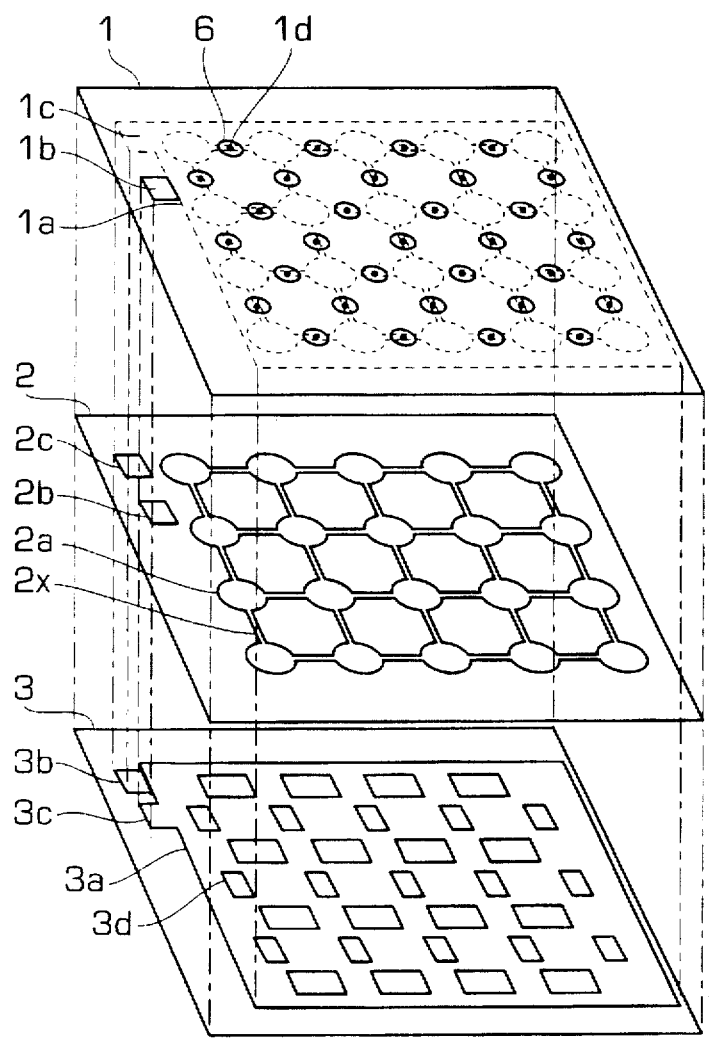
FIG. 2 is an exploded perspective view of the switch shown in FIG. 1.
Figure 3:
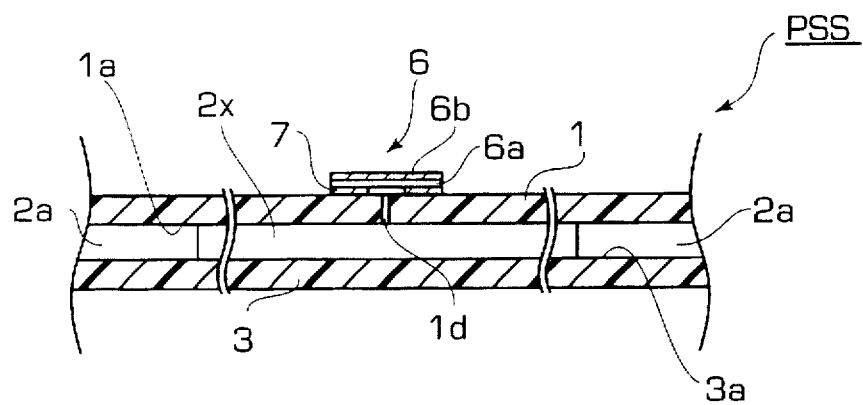
FIG. 3 is an enlarged cross-sectional view taken along line III—III in FIG. 1.

According to the embodiment of FIGS. 1–3, a pressure sensitive switch PSS is formed as a lamination which is made of three bonded layers of a cover film 1 as a first insulating film, an insulating spacer 2 and a base film 3 as a second insulating film.

The base film 3 is formed of a polyethylene naphthalate and has a thickness of 100 μm. The cover film 1, which is in parallel relationship with an upper surface of the base film 3, is formed of a polyethylene naphthalate and has a thickness of 100 μm, similar to the base film 3. The insulating spacer 2, which is interposed or held between the cover film 1 and the base film 3, is formed of a polyethylene terephthalate and has a thickness of 125 μm.

The base film 3 is provided near its upper left corner with a rectangular terminal opening 3b. The base film 3 is formed on its upper surface with a flat electrode sheet 3a by means of a well-known screen printing process. The electrode sheet 3a is set to be within the periphery of the base film 3 and does not interfere with the terminal opening 3b. At the left side of the electrode sheet 3a, there is formed a tab 3c which is integral therewith. The tab 3c is in parallel with the terminal opening 3b along the upper side of the base film 3 and is in line with the terminal opening 3b along the left side of the base film 3. A plurality of openings 3d are provided in the electrode sheet 3a which are in opposition with air-vent portions 2x so the electrode sheet 3a will not be contacted by water in drop phase or liquid phase as will be detailed later. No opening corresponding to the opening 3d is provided in the base film 3 per se.

The cover film 1 is also provided with a rectangular terminal opening 1b which is in vertical alignment with the tab 3c of the electrode sheet 3a on the base film 3. The cover film 1 is provided on its lower surface with a flat electrode sheet 1a by means of a well-known screen printing process. The electrode sheet 1a is set to be within the periphery of the cover film 1 and does not interfere with the terminal opening 1b. At the left side of the electrode sheet 1a, there is formed a tab 1c which is integral therewith. The tab 1c is parallel with the terminal opening 1b along a lower side of the base film 1 and is in line with the terminal opening 1b along the left side of the base film 1. The tab 1c is in vertical alignment with the terminal opening 3b of the base film 3. Except for tab 1c and the tab 3c, the cover film 1 and the base film 3 are in alignment with each other in the vertical direction. It is to be noted that the electrode sheet 1a is provided with openings (not shown) corresponding to the openings 3d of the electrode sheet 3a.

As can be seen from FIGS. 1 and 3, a plurality of small air-passages 1d are provided in the cover film 1 when the layered or bonded structure of the cover film 1, the insulating spacer 2 and the base film 3 is established, in such a manner that each air-passage 1d is expected to establish a fluid communication between the corresponding air-vent 2x and the atmosphere or surroundings. In order to clarify positions of the air-passages 1d, in the cover film 1 shown in FIG. 2, each hole 2a and the adjacent air-vent 2x are depicted in two-dotted or phantom lines.

The insulating spacer 2 has a terminal window 2c and another terminal window 2b which are in alignment with the terminal window 3b of the base film 3 and the terminal window 1b of the cover film 1, respectively, when the layered or bonded structure, as shown in FIG. 1 comprised of the cover film 1, the insulating spacer 2 and the base film 3 is formed. The holes 2a are formed in a region of the insulating spacer 2 which is in opposition to a region of the electrode sheet 1a excluding the tab 1c and a region of the electrode sheet 3a excluding the tab 3c. A total of 20 holes 2a are arranged in a two-dimensional arrangement of a 5×4 matrix mode. Each hole 2a is of 10 mm in diameter and this value is larger than the thickness of the insulating spacer 2 which is 125 μm as previously mentioned. The ratio or magnification of the diameter of the hole 2a to the thickness of the insulating spacer 2 is determined as an acceptable or practical value so long as that when the film 1 is applied with a force toward the film 3 and vice versa, the resultant or deformed film establishes an electric contact between the electrode sheets 1a and 3a when the force is greater than a set value in magnitude and returns to the original electric isolation therebetween when the magnitude of the force becomes less than the set value. The air-vent 2x is used so as to establish an air communication between two adjacent holes 2a. The air-vent 2x is a slit formed in the insulating spacer 2 such that the air-vent 2x passes through the thickness of the insulating spacer 2 and extends along its surface.

When the foregoing laminated or layered structure is established by bonding the base film 3, the insulating spacer 2 and the cover film 1 in such an order, each air-vent 2x of the insulating spacer 2 is brought into air communication with the corresponding air-passage 1d of the cover film 1, the tab 3c of the electrode sheet 3a on the base film 3 is brought into exposure by being in coincidence with the overlapped terminal window 1b of the cover film 1 and the terminal window 2b of the insulating spacer 2, the tab 1c of the electrode sheet 1a on the cover film 1 is brought into exposure by being in coincidence with the overlapped terminal window 2c of the insulating spacer 2 and the terminal window 3b of the base film 3.

The exposed tab 1c of the electrode sheet 1a is soldered with one end of a lead wire 4b of an electric cord 4c which is coated with an insulating material. Similarly, the exposed tab 3c of the electrode sheet 3a is soldered with one end of a lead wire 4a of the electric cord 4c. The terminal window 2b, the terminal window 1b and a vicinity thereof are covered with an insulating cover member 5a. Similarly, the terminal window 2c, the terminal window 3b and a vicinity thereof are covered with an insulating material 5b.

In addition, as best seen in FIG. 3, a porous film or membrane 6a of a sheet 6, which is commercially available as "Gore Tex", is adhered via an adhering sheet 7 to a portion of the cover film 1 over the outer end of each air-passage 1d.

The adhering sheet 7 is formed into a flat ring-shaped structure having a central opening whose diameter is larger than the diameter of the air-passage 1d. The sheet 6 is a layered structure comprised of the porous film 6a as a lower member and a woven protection fabric 6b as an upper member.

The outer end of each air-passage 1d is in air communication with the atmosphere or surroundings through the porous film 6a and the woven protection fabric 6b of the sheet 6. The pressure sensitive switch PSS as shown in FIG. 1 is thus constructed.

Figure 4:
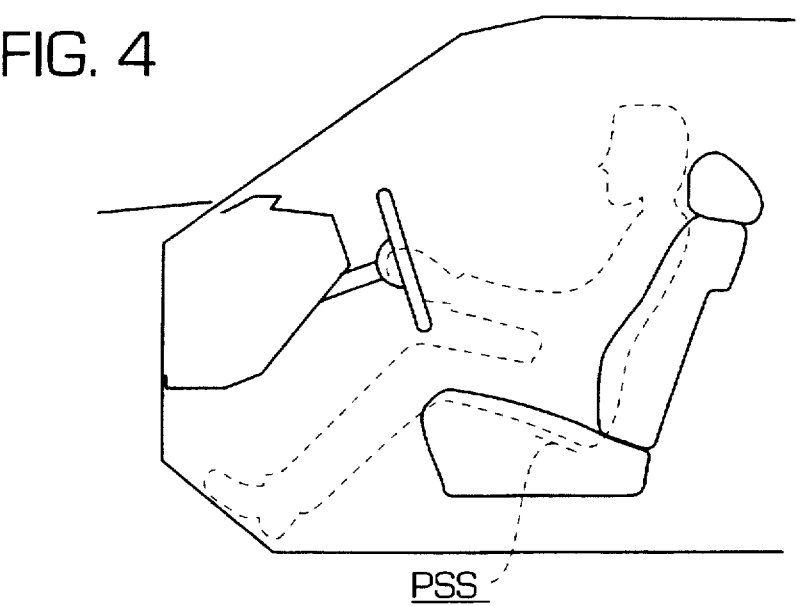
FIG. 4 is a schematic view of the switch shown in FIG. 1 provided in a seat cushion of a vehicle.

As shown in FIG. 4, when the pressure sensitive switch PSS is disposed in a seat cushion of a seat device mounted in a vehicle such that the switch PSS is located near an upper surface of the seat cushion, no electrical contact is established between the electrode sheets 1a and 3a within the hole 2a due to the fact that no substantial force is applied to the pressure sensitive switch PSS when an occupant is not seated on the seat cushion. This means that the pressure sensitive switch PSS remains in its open condition under which the wires 4a and 4b are electrically isolated from each other.

On the other hand, as soon as the occupant sits on the seat cushion, the cover film 1 is deformed toward the base film 3 by the weight of the occupant, whereby the air in each hole 2a of the insulating spacer 2 is ejected or exhausted to the surroundings via the corresponding air-vent 2x and the air-passage 1d. Due to such an air exhaust, the pressure in the hole 2a drops to a degree such that the deformation of the cover film 1 can be established easily. Thus, the electrical contact of the electrode sheet 1a attached to the lower surface of the cover film 1 with the electrode sheet 3a on the base film 3 can be established without difficulties. The resulting contact brings an electric connection between wires 4a and 4b of the cord 4c.

Due to the fact the width of the air-vent 2x is smaller than the diameter of the hole 2a, even though a small force is applied to the cover film 1, no electric contact can be established between the electrode sheets 1a and 3a in the vicinity of the air-vent 2x. When the force applied from the occupant to the hole 2a of the insulating spacer 2 is released, the cover film 1 begins, due to its restoring force, to move away from the electrode sheet 3a. At this time, from the surrounding atmosphere, external air flows into the hole 2a through the nearest air-passage 1d and the air-vent 2x and the resultant air increases the pressure in the hole 2a which depends on the foregoing resorting force. Thus, after moving away from the base film 3, the cover film 1 can be returned to its original condition under which no force is applied thereto.

Through the air-vent 2x and the air-passage 1d, the hole 2a of the insulating spacer 2 can receive air-flow into and out of the spacer 2. When a force is applied to the hole 2a via the cover film 1, the air within the hole 2a, which acts as a resistance to the force, is exhausted to the atmosphere, resulting in the easy establishment of the displacement or deformation of the cover film 1 toward the hole 2a. On the other hand, when the force applied to the hole 2a is released, air is introduced into the hole 2a through the air-passage 1d and the air-vent 2x and increases the pressure in the hole 2a to the original pressure value together with movement of the cover film 1 away from the base film 3. Thus, the cover film 1 can be returned to its original condition under which no force is applied to the cover film 1. In brief, the engagement and withdrawal of the cover film 1 relative to the base film 3 can be accomplished with ease, with the result that a highly quick operation or response of the switch PSS can be attained even though the pressure applied to the cover film 1 varies over a wide range.

It is to be emphasized that the polyethylene naphthalate employed as the raw material of the cover film 1 and the base film 3 is of a highly mechanical strength and is suitable for receiving the weight pressure from the occupant when the switch PSS is provided in the seat cushion as previously mentioned. The glass transition temperature $T_g$ of the polyethylene naphthalate at which its physical properties such as specific heat, the coefficient of expansion and compressibility change is 113 degrees Centigrade. This means that the polyethylene naphthalate is excellent against high temperatures and is also suitable for on-vehicle use under cold conditions. Each of the electrode sheets 1a and 3a has to be only a mere conductive element, which can be formed at a low cost and without difficulties and thus, the pressure sensitive switch PSS can be made or obtained inexpensively.

Figure 5:
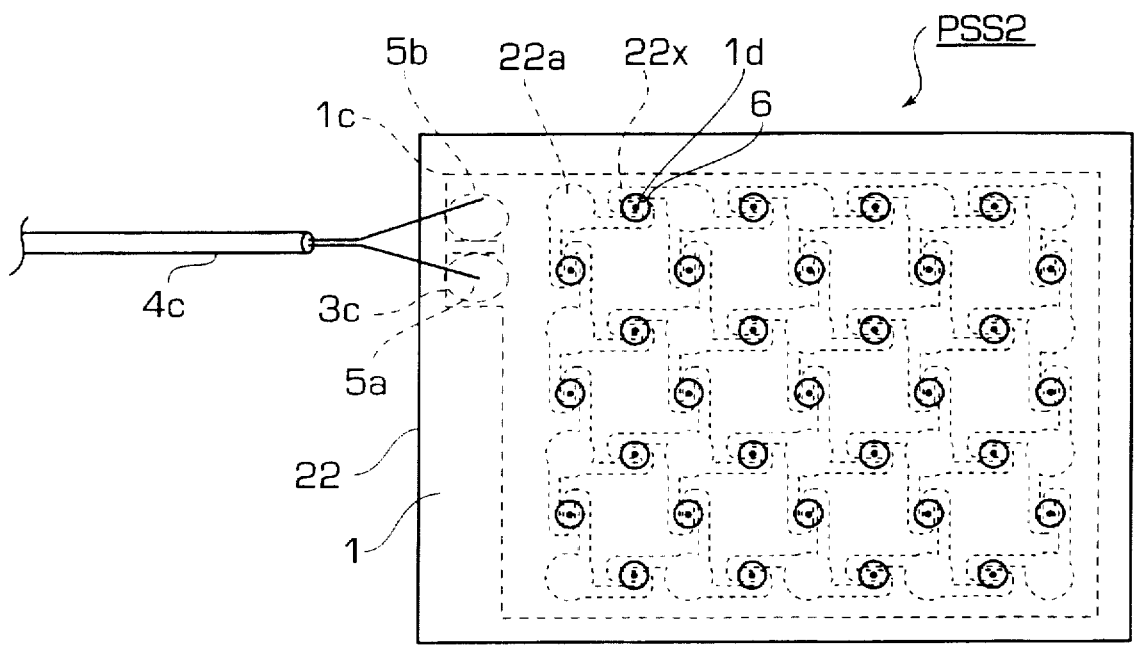
FIG. 5 is a plan view of a pressure sensitive switch according to a second embodiment of the present invention.

In FIG. 5, a pressure sensitive switch PSS2 according to a second embodiment of the present invention is shown. The pressure sensitive switch PSS2 is identical with the foregoing pressure sensitive switch PSS in construction and operation except that in switch PSS2, each air-vent 22x of a insulating spacer 22 is formed into an "S" shaped configuration. In detail, the air-vent 22x, which serves for air communication between two adjacent holes 22a and 22a, has a central portion which is in air communication with an air-passage 1d of a cover film 1. Air can be exhausted from and introduced into the hole 22a through the air-vent 22x air the air-passage 1d. Thus, similar to the pressure sensitive switch PSS according to the first embodiment, the engagement and withdrawal of the cover film 1 relative to the base film 3 can be established with ease, with the result that a highly quick operation or response of the switch PPS2 can be attained even though the pressure applied to the cover film 1 varies over a wide range. In addition, even though water which is in the form of drops or liquid is present, due to high coefficient of friction, movement of the water throughout the S-shaped air-vent 22x is prevented and only air passes through the air-vent 22x. Thus, electrode sheets 1a and 3a are free from water, whereby no corrosion of the electrode sheets 1a and 3a by water can occur. Thus, the deterioration of the pressure sensitive switch PSS2 with the passing of time is very rare.

Figure 6:
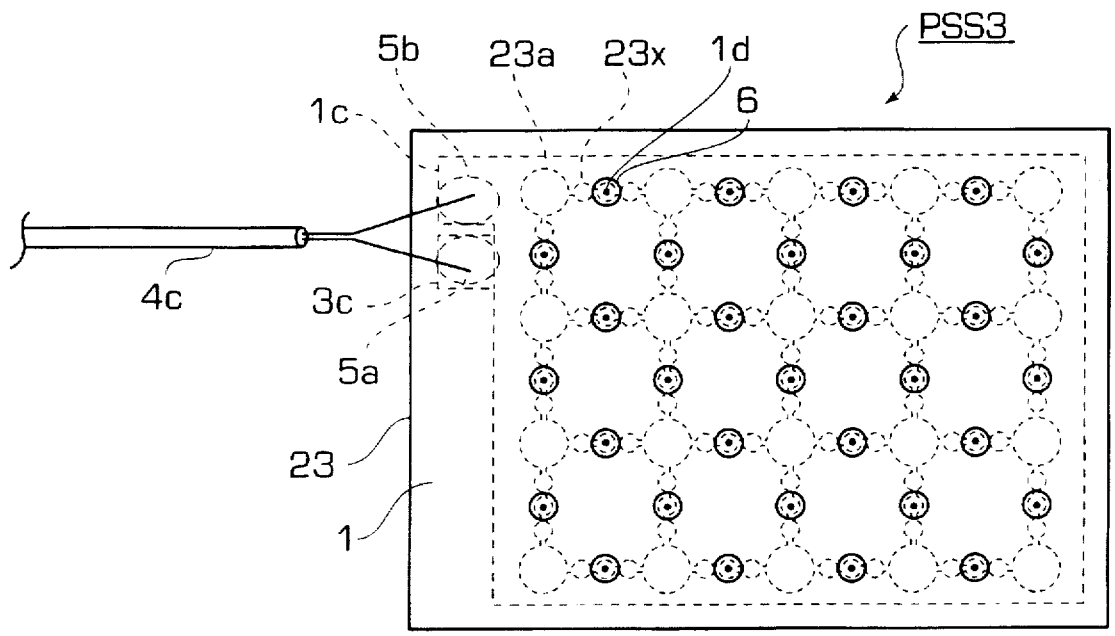
FIG. 6 is a plan view of a pressure sensitive switch according to a third embodiment of the present invention.

In FIG. 6, there is illustrated a pressure sensitive switch PSS3 according to a third embodiment of the present invention. The pressure sensitive switch PSS3 is identical with the foregoing pressure sensitive switch PSS in construction and operation except that in switch PSS3, each air-vent 23x of an insulating spacer 23 is formed into a configuration which has three circular portions arranged in series such that the intermediate one is in coincidence with an air-passage 1d. Air can be exhausted from and introduced into the hole 23a through the air-vent 23x and the air-passage 1d. Thus, similar to the pressure sensitive switch PSS according to the first embodiment, the engagement and withdrawal of the cover film 1 relative to the base film 3 can be established with ease, with the result that a highly quick operation or response of the switch PSS3 can be attained even though the pressure applied to the cover film 1 varies over a wide range. In addition, even though water which is in the form of drops or liquid is present due to the high resistance value thereof, movement of the water through the circular portion of a wide width of the air-vent 23x is prevented and only air passes through the air-vent 23x. Thus, electrode sheets 1a and 3a are free from the water so that no corrosion of the electrode sheets 1a and 3a by water can occur. Thus, deterioration of the pressure sensitive switch PSS3 with the passing of time is rare.

In each of the foregoing three embodiments, the air passage 1d which is in air communication with the air-vent can be provided in the cover film 1. Although the cover film 1, the insulating spacer 2 and the base film 3 are identical rectangular plates in each embodiment, the cover film 1, the insulating spacer 2 and the base film 3 may be formed as identical rectangular plates having projecting ears so that the portion from which the cord is extended is located outside the rectangular portion.

In addition, the overall shape of the pressure sensitive switch can be formed into any desired shape such as a straight line shape, a curved line shape, a radial band shape and so on, instead of the foregoing rectangular shape.

It is to be noted that the air-passage 1d and the opening 3d are located at upper and lower sides of each of the air-vents 2x, 22x and 23x as can be seen from FIG. 2 and thus, water entering therein fails to reach the electrode sheet 1a and the electrode sheet 3a.

In addition, gasses such as air can pass through the porous film 6 such as "Gore-Tex" easily while the passage of a liquid is prevented. Thus, entrance or invasion of water drops into the air passage 1d in each embodiment is prevented, which results in a reliable assurance of the prevention of corrosion of electrode sheets 1a and 3a.

The invention has thus been shown and described with reference to specific embodiments. However, it should be noted that the invention is in no way limited to the details of the illustrated structures but changes and modifications may be made without departing from the spirit and scope of the invention.

What is claimed is:

1. A pressure sensitive switch comprising:
   a first insulating film provided on one surface thereof with a first electrode sheet;

an insulating spacer having a first surface connected to said one surface of the first insulating film, the insulating spacer having a plurality of holes disposed in mutual air communication through a plurality of air-vents and extending through the insulating spacer from said first surface to a second surface parallel to said first surface;

a second insulating film provided on one surface thereof with a second electrode sheet, said one surface of the second insulating film being connected to said second surface of the insulating spacer;

a cord having a first wire and a second wire connected to the first electrode sheet on the first insulating film and the second electrode sheet on the second insulating film, respectively; and a plurality of air passages extending through one of the first insulating film and the second insulating film and disposed in air communication with said air-vents, respectively, and an external surface, wherein a portion of each air-vent disposed in air communication with each air passage is widened in width.

2. A pressure sensitive switch in accordance with claim 1, wherein at least one sheet comprised of an air porous film is secured to said external surface over said at least one air passage.

3. A pressure sensitive switch in accordance with claim 2, wherein air porous film is "Gore-Tex".

4. A pressure sensitive switch in accordance with claim 1, wherein the at least one hole has a diameter which is larger than a thickness of the insulating spacer and the at least one air-vent has a width which is narrower than the diameter of the at least one hole.

* * * * *